United States Patent
Natale et al.

(10) Patent No.: US 10,124,721 B2
(45) Date of Patent: Nov. 13, 2018

(54) SYSTEM TO AUGMENT AUTOMOTIVE FACTORY LIGHTS WITH WARNING LIGHT FUNCTION

(71) Applicant: ATOMIC LED, LLC, Greenville, RI (US)

(72) Inventors: Mark Natale, Greenville, RI (US); Kyle Wandyes, Chepachet, RI (US)

(73) Assignee: ATOMIC LED, LLC, Greenville, RI (US)

( * ) Notice: Subject to any disclaimer, the term of this patent is extended or adjusted under 35 U.S.C. 154(b) by 0 days.

(21) Appl. No.: 15/685,092

(22) Filed: Aug. 24, 2017

(65) Prior Publication Data
US 2018/0056857 A1    Mar. 1, 2018

Related U.S. Application Data

(60) Provisional application No. 62/379,156, filed on Aug. 24, 2016.

(51) Int. Cl.
*B60Q 1/46* (2006.01)

(52) U.S. Cl.
CPC .................................. *B60Q 1/46* (2013.01)

(58) Field of Classification Search
CPC ....................................................... B60Q 1/46
See application file for complete search history.

(56) References Cited

U.S. PATENT DOCUMENTS

2017/0349093 A1* 12/2017 Peacock .................. B60Q 1/46

* cited by examiner

*Primary Examiner* — Leon Flores
(74) *Attorney, Agent, or Firm* — Barlow Josephs and Holmes Ltd; Stephen Holmes

(57) ABSTRACT

A vehicle warning light system includes a flasher module configured to selective operate a plurality of vehicle lights with a flashing pattern. An adapter is connected to the flasher unit having a first end configured to connect to a vehicle computer and a second end configured to receive a vehicle lighting connector. The adapter electrically connecting preselected vehicle lights to the flasher module. When installed in a vehicle and activated, the flasher unit augments the normal vehicle lighting function with a warning light function.

20 Claims, 6 Drawing Sheets

SYSTEM TO AUGMENT AUTOMOTIVE FACTORY LIGHTS WITH WARNING LIGHT FUNCTION

CROSS-REFERENCE TO RELATED APPLICATION

This application claims priority to earlier filed U.S. Provisional Application Ser. No. 62/379,156, filed Aug. 24, 2016, the contents of which are incorporated herein by reference.

BACKGROUND OF THE INVENTION

1. Field of the Invention

The present patent document relates generally to vehicle exterior lighting and more particularly to a system to augment the factory lights with a warning light function.

2. Background of the Related Art

Cars and trucks are equipped with a variety of factory-installed exterior lights, including headlights, auxiliary driving lights, back up and safety lights, brake lights, parking lights, fog lights, and directional or turn signals. These vehicles are also equipped with a vehicle computer that controls emissions, provides diagnostic information and generally controls the electrical system of the vehicle, including the factory vehicle lights. A vehicle computer is generally illustrated in FIG. 1 at 10. These vehicle computers 10 include a number of ports 12 to connect the various electrical components of the vehicle to the computer 10. An exemplary vehicle lighting connector 14, such as a factory plug, is shown connected to a port 12 of the vehicle computer 10 in FIG. 2. The vehicle lighting connector 14 includes a number of wires 16 to the vehicle lighting and other electrical components of the vehicle.

Emergency responders and others involved in trades often have a need for warning lights that flash and strobe to alert other motorists of their approach. Adding this functionality to a vehicle often meant adding additional lights to the vehicle, which necessitates drilling holes in the vehicle and cutting and splicing wires into the vehicle electrical system. Therefore, there is a perceived need to convert factory equipped lights with functionality of warning lights, that does not require cutting of wires or modification of the vehicle or mounting of an exterior warning light assembly on the vehicle.

SUMMARY OF THE INVENTION

The system described herein solves the problems of the prior art by providing a system to augment automotive factory lights with a warning light function, which removes the need to mount additional, external lights and/or cut and splice wires into the vehicle electrical system. The system generally includes a flasher module configured to selective operate a plurality of vehicle lights with a flashing pattern. An adapter is connected to the flasher unit having a first end configured to connect to a vehicle computer and a second end configured to receive a vehicle lighting connector. The adapter electrically connecting pre-selected vehicle lights to the flasher module. When installed in a vehicle and activated, the flasher unit augments the normal vehicle lighting function with a warning light function.

BRIEF DESCRIPTION OF THE DRAWINGS

These and other features, aspects, and advantages of the present invention will become better understood with reference to the following description, appended claims, and accompanying drawings where:

DESCRIPTION OF THE PREFERRED EMBODIMENT

Figure 1:
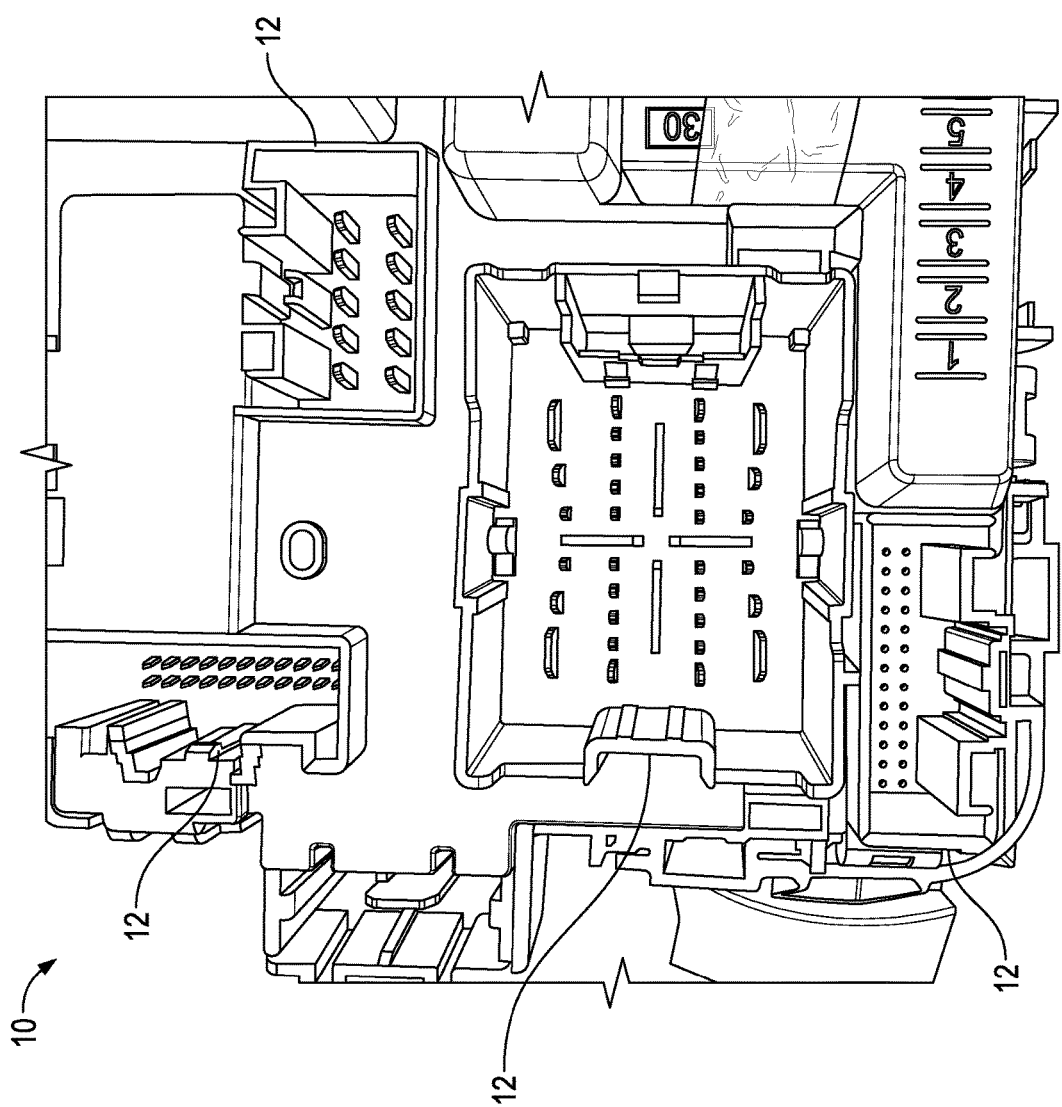
FIG. 1 is a partial top view of a prior art vehicle computer.
Figure 2:
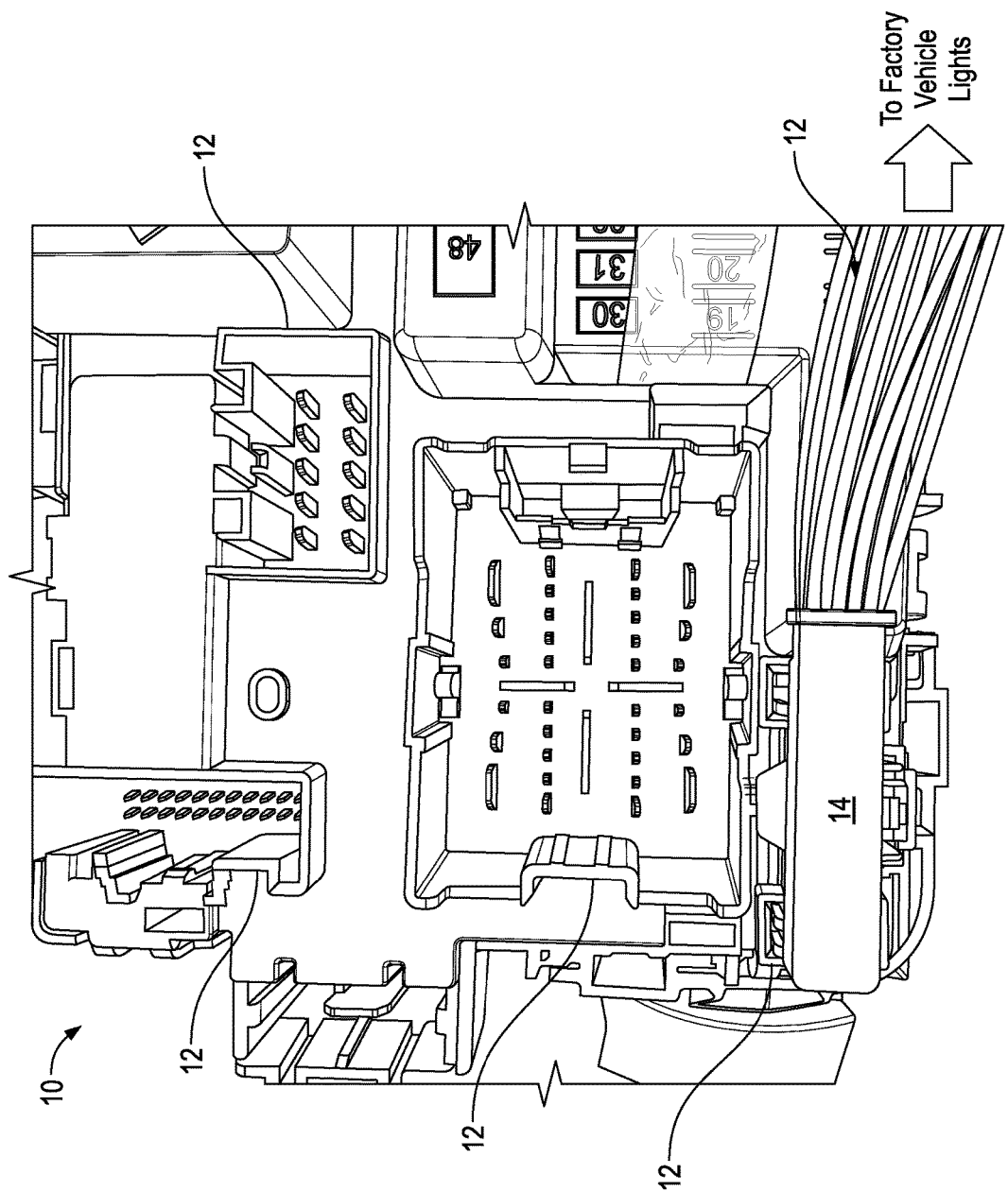
FIG. 2 is a partial top view of a prior art vehicle computer with factory lights connector installed in a lighting control port.
Figure 3:
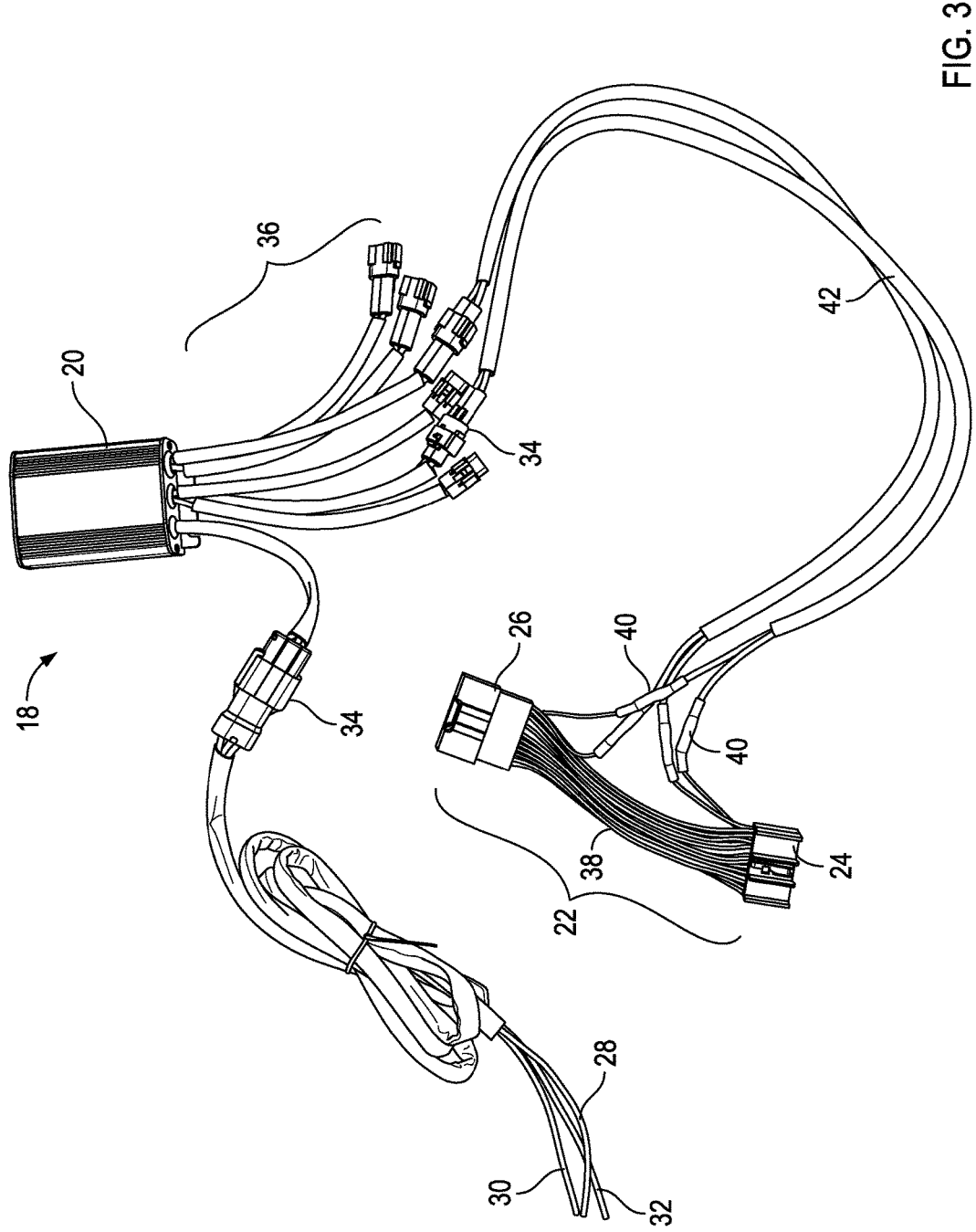
FIG. 3 is a top view of the system to augment automotive factory lights with a warning function, as described herein.
Figure 4:
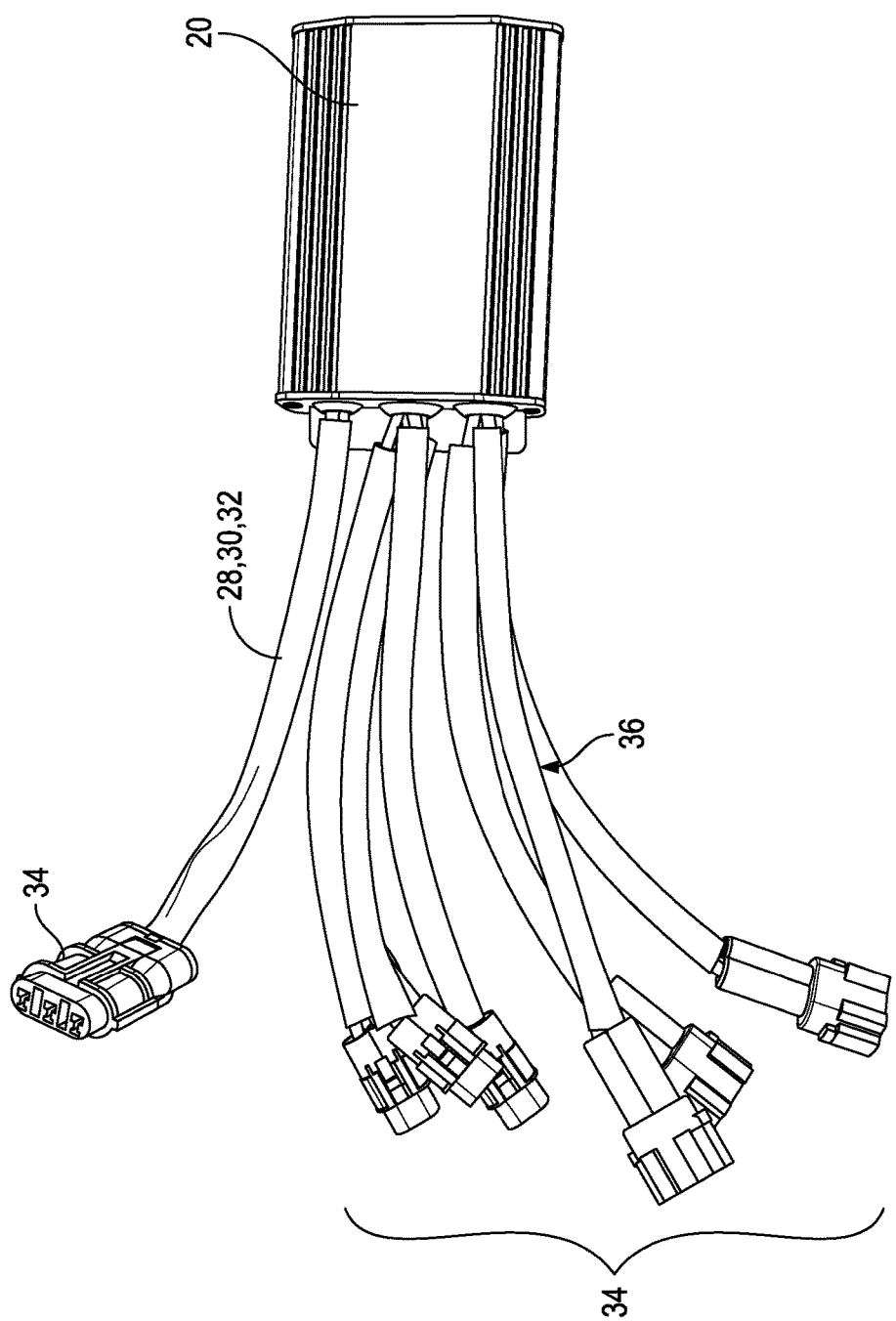
FIG. 4 is a close-up top view of a flasher unit for the system described herein.
Figure 5:
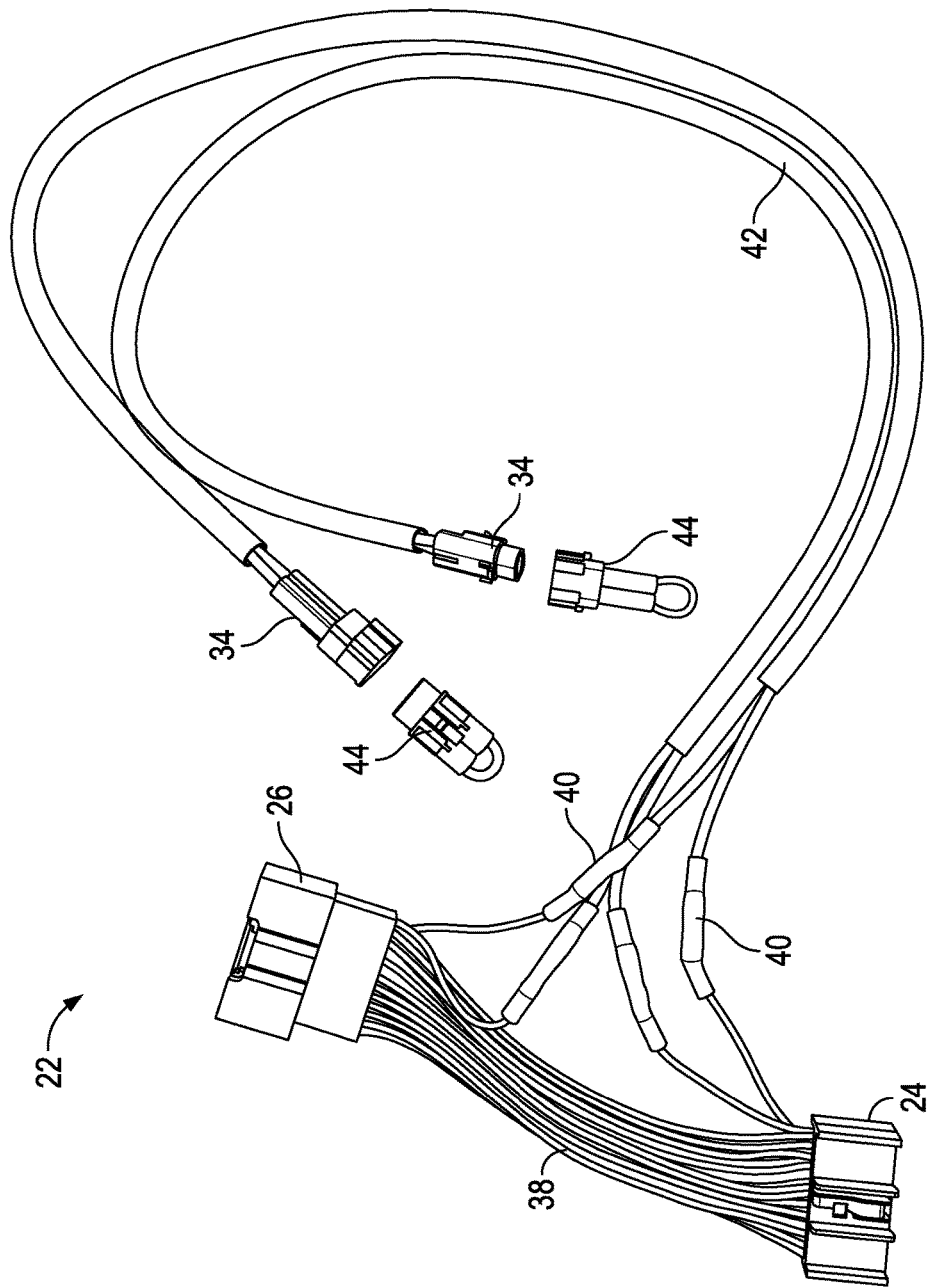
FIG. 5 is a close-up top view of a bypass adapter for the system as described herein.
Figure 6:
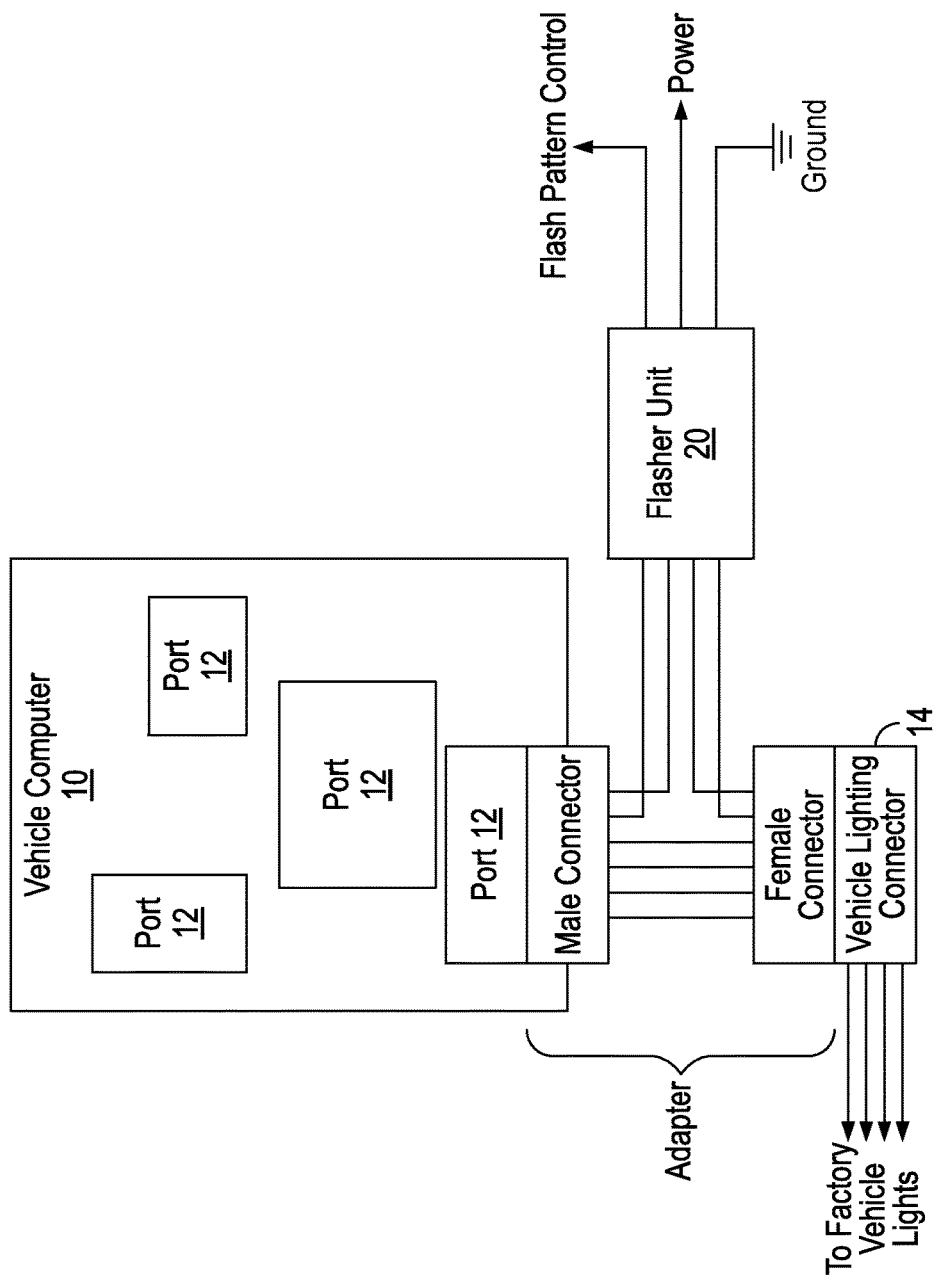
FIG. 6 is a diagram of the system connected to a vehicle computer and lighting system, in accordance with the system described herein.

Referring to FIGS. 3-6, the system to augment factory lighting with a warning function is shown generally at 18. The system 18 is designed to convert or augment original equipment manufacturer ("OEM") factory lights, including headlights, auxiliary driving lights, back up and safety lights, brake lights, parking lights, fog lights, and directional or turn signals, on a vehicle into warning lights, which flash a pattern. When the warning system 18 is not activated, the factory lights on the vehicle will operate as normal. When the system 18 is activated, the factory lights will work as warning lights. Preferably, the factory installed lights are converted with LED lights for additional efficiency and/or power requirements of the flasher module 20.

The system 18 includes a flasher module 20 with an adapter 22 having a first connector 24 configured to connect to the port 12 on the vehicle computer 10 and a second connector 26, such as a female socket, configured to receive the factory plug or connector 14 of the factory lights of the vehicle. Where appropriate the adapter includes bypass wires 38 between the first connector and second connector, allowing the lighting connector 14 to connect to the vehicle computer 10 without routing through the flasher module 10. Desired lighting circuits include pre-spliced connections 40 with wires 42 connected to the flasher module 20 via quick disconnects 34. Alternatively, if specific vehicle lights are not desired to be controlled, quick disconnects 34 of the wires 42 may be capped with a bypass cap 44, which makes the pre-spliced connection 40 function as a bypass wire 38.

The flasher module 20 further includes a ground wire 28, a power wire 30 and a flash pattern wire 32 extending therefrom. The flash pattern wire 32 is connected to a switch, often installed on the dashboard of the vehicle. The flasher module includes an electrical circuit with preprogrammed flash patterns that may be selected by cycling through the patterns. This electrical circuit is well known in the art and need not be described herein.

The system 18 plugs directly in between the vehicles computer 10 and factory vehicle lighting wiring, via the vehicle lighting connector 14, without cutting any wires. To install this system 18, unplug the indicated plug or connector 14 from the vehicle computer 10, plug flasher module adapter 22 connector 24 into the port 12 on the vehicle computer 10, plug factory plug connector 14 into the second connector socket 26. The user may than connect the adaptor plugs to the control wires 36 of flasher module 20 via quick disconnects 34. Each control wire 36 is configured to control a different lighting circuit of the vehicle. The three wires 28, 30, 32 coming out of the flasher module 20 are connected, respectively, to the ground, power and to a switch. Specifically, the ground wire 28 is connected to a ground, and the power wire 30 is connected to a fused 12 volt switch and the flash pattern wire 32 is connected to a momentary push button that are mounted on the dashboard of the vehicle (touch 12 volts to the wire briefly to advance to the next flash pattern.) The three wires 28, 30, 32 may also be connected to the flasher module 20 with a quick disconnect 34.

Therefore, it can be seen that the present invention provides a unique solution to the problem of augment factory lighting of a vehicle with a warning function that does not require mounting additional exterior lighting, drilling of holes in the vehicle and/or the cutting and splicing of wires of the vehicle electrical system.

It would be appreciated by those skilled in the art that various changes and modifications can be made to the illustrated embodiments without departing from the spirit of the present invention. All such modifications and changes are intended to be within the scope of the present invention except as limited by the scope of the appended claims.

What is claimed is:

1. A vehicle warning light system, comprising:
   a flasher module configured to selectively operate a plurality of vehicle lights with a flashing pattern; and
   an adapter having a first end with a first connector, the first connector being configured to connect to a vehicle computer and a second end having a second connector, the second connector being configured to receive a vehicle lighting connector, the adapter serially connecting the vehicle computer upstream of the flasher module and serially connecting the flasher module upstream of the vehicle lights for preselected vehicle lights, the adapter electrically connecting the pre-selected vehicle lights to the flasher module;
   wherein, when installed in a vehicle and activated, the flasher module bypasses the normal vehicle lighting function with a warning light function for the preselected vehicle lights.

2. The system of claim 1, wherein the first connector is a male connecter.

3. The system of claim 2, wherein the second connector is a female connector.

4. The system of claim 1, wherein the vehicle lighting circuits are selected from the group consisting of headlights, auxiliary driving lights, back up lights, safety lights, brake lights, parking lights, fog lights, and directional signals.

5. The system of claim 1, wherein the flasher module further comprises quick disconnects between the adapter and the flasher module for at least each of the preselected lights.

6. The system of claim 1, wherein the adapter includes bypass wires connected between the first end and the second end.

7. The system of claim 1, further comprising a flash pattern control input connected to the flasher module.

8. The system of claim 7, wherein the flasher module includes a number of preprogrammed flasher patterns.

9. A vehicle warning light system, comprising:
   a flasher module configured to selectively operate a plurality of vehicle lights with a flashing pattern;
   an adapter connected to the flasher module, the adapter having a first end configured to connect to a vehicle computer and a second end configured to receive a vehicle lighting connector, the adapter electrically connecting pre-selected vehicle lights to the flasher module between the first end and the second end of the adapter; and
   the adapter including pre-spliced wires having quick disconnects to provide individual connection of wires, for the pre-selected vehicle lights, between the adapter and the flasher module;
   wherein, when installed in a vehicle and activated, the flasher module augments the normal vehicle lighting function with a warning light function.

10. The system of claim 9, wherein the first end of the adapter is a male connecter.

11. The system of claim 10, wherein the second end of the adapter is a female connector.

12. The system of claim 9, wherein the vehicle lighting circuits are selected from the group consisting of headlights, auxiliary driving lights, back up lights, safety lights, brake lights, parking lights, fog lights, and directional signals.

13. The system of claim 11, wherein the adapter includes bypass wires connected between the first end and the second end, and a plurality of the bypass wires are the pre-spliced wires.

14. The system of claim 9, further comprising a flash pattern control input connected to the flasher module.

15. The system of claim 14, wherein the flasher module includes a number of preprogrammed flasher patterns.

16. A vehicle warning light system, comprising:
   a flasher module configured to selectively operate a plurality of vehicle lights with a flashing pattern; and
   an adapter connected to the flasher module, the adapter having a first end configured to connect to a vehicle computer and a second end configured to receive a vehicle lighting connector, the adapter electrically connecting pre-selected vehicle lights to the flasher module;
   wherein the adapter includes bypass wires connected between the first end and the second end;
   wherein, when installed in a vehicle and activated, the flasher module augments the normal vehicle lighting function with a warning light function; and
   wherein, the adapter serially connects the vehicle computer upstream of the flasher module and serially connects the flasher module upstream of the vehicle lights for preselected vehicle lights.

17. The system of claim 16, wherein the first end of the adapter is a male connecter.

18. The system of claim 17, wherein the second end of the adapter is a female connector.

19. The system of claim 16, wherein the vehicle lighting circuits are selected from the group consisting of headlights, auxiliary driving lights, back up lights, safety lights, brake lights, parking lights, fog lights, and directional signals.

20. The system of claim 16, further comprising a flash pattern control input connected to the flasher module, and wherein the flasher module includes a number of preprogrammed flasher patterns selectable through the flash pattern control input.

* * * * *